US012608914B2

(12) United States Patent (10) Patent No.: US 12,608,914 B2
Denaro et al. (45) Date of Patent: Apr. 21, 2026

(54) METHOD, SYSTEMS, AND APPARATUSES FOR HEATMAP REGRESSION IN A NEURAL NETWORK

(71) Applicant: STMicroelectronics International N.V., Geneva (CH)

(72) Inventors: Davide Denaro, Milan (IT); Claudio Domenico Marchisio, Milan (IT)

(73) Assignee: STMicroelectronics International N.V., Geneva (CH)

( * ) Notice: Subject to any disclaimer, the term of this patent is extended or adjusted under 35 U.S.C. 154(b) by 258 days.

(21) Appl. No.: 18/545,876

(22) Filed: Dec. 19, 2023

(65) Prior Publication Data

US 2025/0200944 A1 Jun. 19, 2025

(51) Int. Cl.
*G06V 10/766* (2022.01)
*G06T 3/4046* (2024.01)
*G06T 7/73* (2017.01)
*G06V 10/82* (2022.01)
*G06V 40/10* (2022.01)

(52) U.S. Cl.
CPC .......... *G06V 10/766* (2022.01); *G06T 3/4046* (2013.01); *G06T 7/73* (2017.01); *G06V 10/82* (2022.01); *G06V 40/10* (2022.01); *G06T 2207/10028* (2013.01); *G06T 2207/20081* (2013.01); *G06T 2207/20084* (2013.01); *G06T 2207/30196* (2013.01)

(58) Field of Classification Search
CPC ...... G06V 10/766; G06V 40/10; G06V 10/82; G06T 7/73; G06T 3/4046; G06T 2207/10028; G06T 2207/20081; G06T 2207/20084; G06T 2207/30196

USPC .......................................................... 382/115
See application file for complete search history.

(56) References Cited

U.S. PATENT DOCUMENTS

2021/0350206 A1 11/2021 Howard et al.
2023/0086042 A1* 3/2023 Yuan ..................... G06T 7/0016
382/131

(Continued)

FOREIGN PATENT DOCUMENTS

CN 110942144 A 3/2020
CN 113012150 A 6/2021

(Continued)

OTHER PUBLICATIONS

Wang et al., "Deep High-Resolution Representation Learning for Visual Recognition," arXiv.org, 1908.07919v2, (Mar. 2020).

(Continued)

*Primary Examiner* — Jonathan S Lee
(74) *Attorney, Agent, or Firm* — Alston & Bird LLP

(57) ABSTRACT

Methods, systems, and apparatuses for heatmap regression for neural networks are provided, including for systems with restricted computational resources, such as embedded systems. An exemplary method may include utilizing a trained neural network having a plurality of pooling layers, a plurality of convolutional layers, and an output layer to generate a heatmap. The plurality of pooling layers may reduce the spatial resolution of an input image, though the resolution may not be reduced below the spatial resolution of the output layer. The plurality of convolutional layers may utilize a plurality of depthwise convolutions and pointwise convolutions that will be stacked to provide a plurality of bottlenecks.

20 Claims, 4 Drawing Sheets

(56) References Cited

U.S. PATENT DOCUMENTS

| | | |
|---|---|---|
| 2023/0096021 A1 | 3/2023 | Trockman et al. |
| 2023/0137381 A1 | 5/2023 | Fan et al. |

FOREIGN PATENT DOCUMENTS

| | | |
|---|---|---|
| CN | 114119704 A | 3/2022 |
| CN | 110728200 B | 6/2023 |

OTHER PUBLICATIONS

Newell et al., "Stacked Hourglass Networks for Human Pose Estimation," arXiv.org, 1603.06937v2, (Jul. 2016).

Long et al., "Fully Convolutional Networks for Semantic Segmentation," arXiv.org, 1411.4038v2, (Mar. 2015).

Xiao et al., "Simple Baselines for Human Pose Estimation and Tracking," arXiv.org, 1804.06208v2, (Aug. 2018).

* cited by examiner

METHOD, SYSTEMS, AND APPARATUSES FOR HEATMAP REGRESSION IN A NEURAL NETWORK

TECHNOLOGICAL FIELD

Example embodiments of the present disclosure relate generally to heatmap regression in a neural network, including heatmap regression in neural networks in embedded systems.

BACKGROUND

Heatmaps are used to determine one or more key points in an image. Such heatmaps may be generated by conventional neural networks using heatmap regression. Conventional neural networks performing heatmap regression use complex neural networks that require large computational resources due, among other things, to the type of layers of the neural networks. Such neural networks may include topologies with downscaling an image and then subsequent upscaling in a resolution recovery stage to generate a heatmap. Such conventional neural network topologies require greater memory resources, greater power consumption, and are slower to process or compute on systems with restricted resources.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to heatmap regressions for neural networks.

In accordance with some embodiments of the present disclosure, an example method for heatmap regression with a neural network is provided. The method for heatmap regression with a neural network may comprise: receiving an image; generating a heatmap from the image with a neural network by: reducing the spatial resolution of the input image with one or more pooling layers, wherein a reduction in the spatial resolution is to a spatial resolution of an output layer; performing a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers; generating the output layer, wherein the output layer includes a depth channel of a first depth resolution; and generating a heatmap with a plurality of key points, wherein a number of the plurality of key points equals the first depth resolution.

In some embodiments, a depth channel resolution of at least one of the depthwise convolution and pointwise convolution bottlenecks has the same depth channel resolution as the output layer.

In some embodiments, depth channel resolution of each of the plurality of depthwise convolution and pointwise convolution bottlenecks is the same.

In some embodiments, a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

In some embodiments, the one or more pooling layers include two pooling layers.

In some embodiments, the spatial resolution of the output layer is 64×64 pixels and a depth channel resolution of the output layer is 17 features.

In some embodiments, the key points of the heatmap are coordinates in the image identifying a person.

In accordance with some embodiments of the present disclosure, an example system for heatmap regression with a neural network is provided. The system for heatmap regression with a neural network may comprise at least one processor and at least one memory coupled to the processor, wherein the processor is configured to: receive an image; generate a heatmap from the image with a neural network by: reduce a spatial resolution of the input image with one or more pooling layers, wherein a reduction in the spatial resolution is to a spatial resolution of an output layer; perform a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers; generate the output layer, wherein the output layer includes a depth channel of a first depth resolution; and generate a heatmap with a plurality of key points, wherein a number of the plurality of key points equals the first depth resolution.

In some embodiments, a depth channel resolution of at least one of the depthwise convolution and pointwise convolution bottlenecks has the same depth channel resolution as the output layer.

In some embodiments, the depth channel resolution of each of the plurality of depthwise convolution and pointwise convolution bottlenecks is the same.

In some embodiments, a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

In some embodiments, the one or more pooling layers include two pooling layers.

In some embodiments, the spatial resolution of the output layer is 64×64 pixels and a depth channel resolution of the output layer is 17 features.

In some embodiments, the key points of the heatmap are coordinates in the image identifying a person.

In accordance with some embodiments of the present disclosure, an example of computer program product for heatmap regression with a neural network is provided. The computer program product for heatmap regression with a neural network may comprise at least one non-transitory computer-readable storage medium having computer-readable program code portions stored therein, the computer-readable program code portions comprising an executable portion configured to: receive an image; generate a heatmap from the image with a neural network by: reduce a spatial resolution of the input image with one or more pooling layers, wherein a reduction in the spatial resolution is to a spatial resolution of an output layer; perform a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers; generate the output layer, wherein the output layer includes a depth channel of a first depth resolution; and generate a heatmap with a plurality of key points, wherein a number of the plurality of key points equals the first depth resolution.

In some embodiments, a depth channel resolution of at least one of the depthwise convolution and pointwise convolution bottlenecks has the same depth channel resolution as the output layer.

In some embodiments, the depth channel resolution of each of the plurality of depthwise convolution and pointwise convolution bottlenecks is the same.

In some embodiments, a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

In some embodiments, the one or more pooling layers include two pooling layers.

In some embodiments, the key points of the heatmap are coordinates in the image identifying a person.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
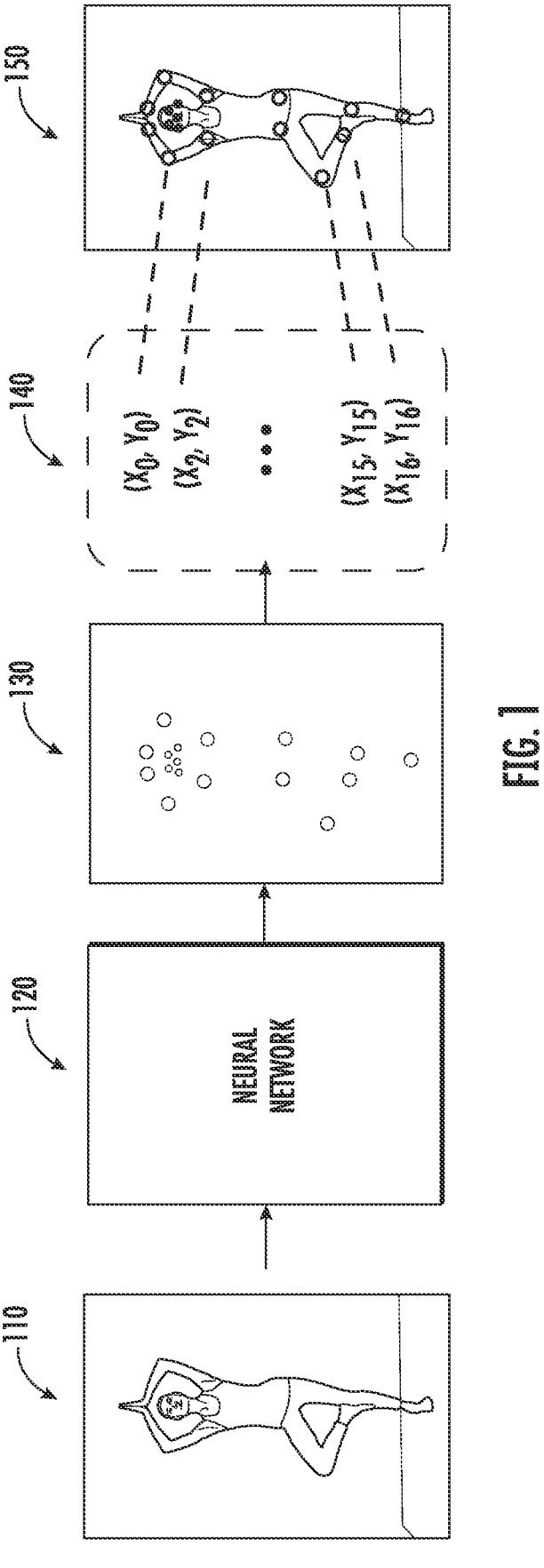
Figure 2:
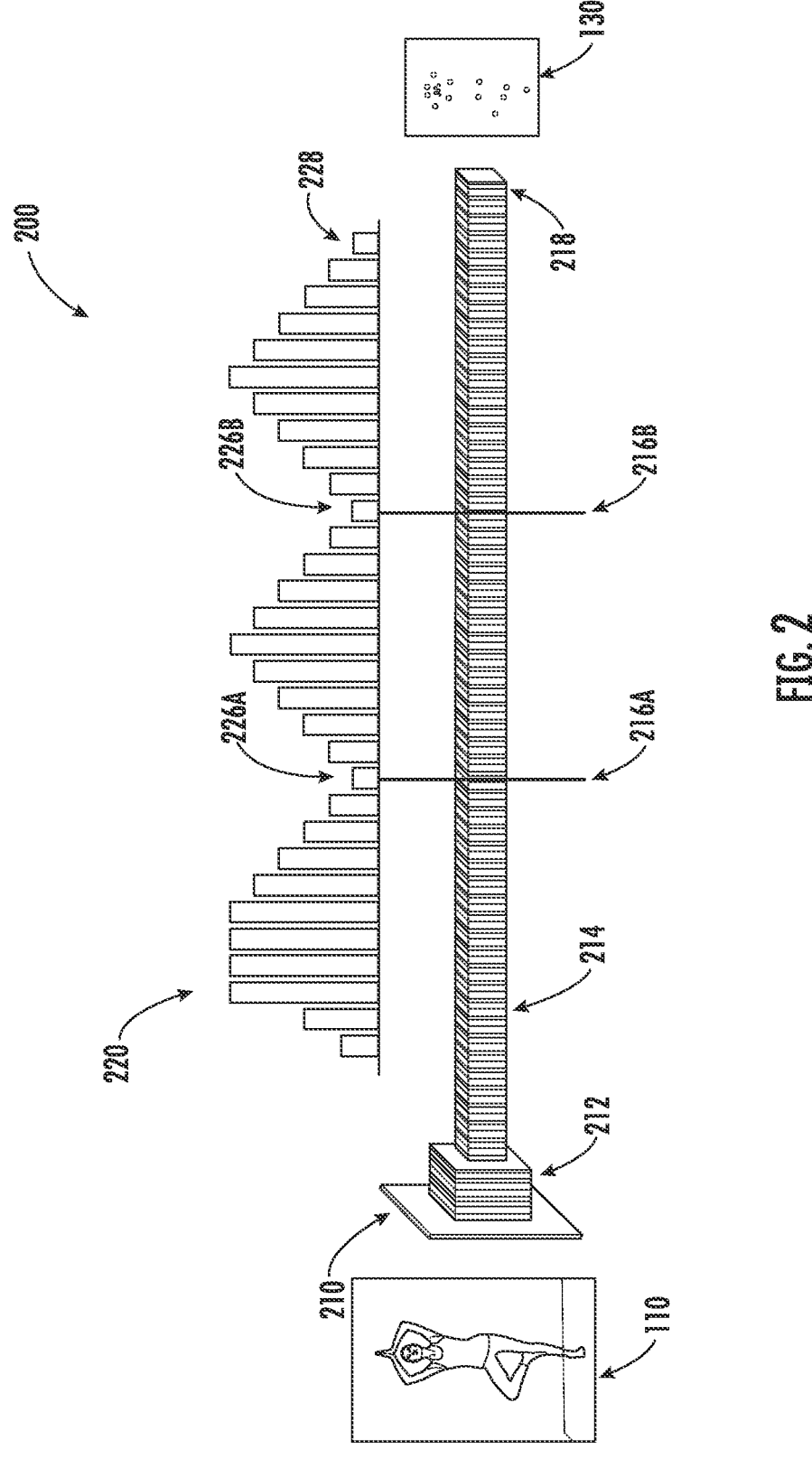
Figure 3A:
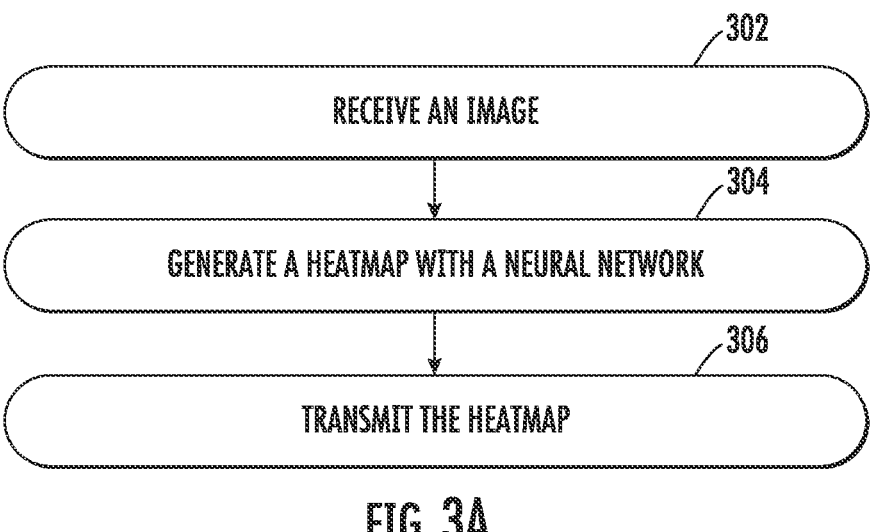
Figure 3B:
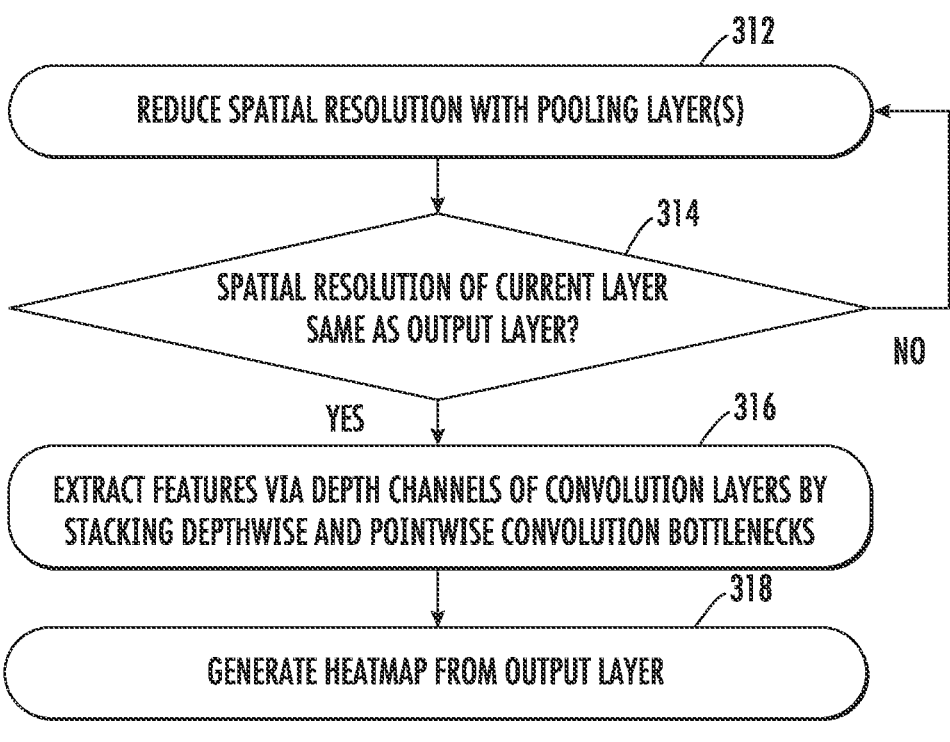
Figure 4:
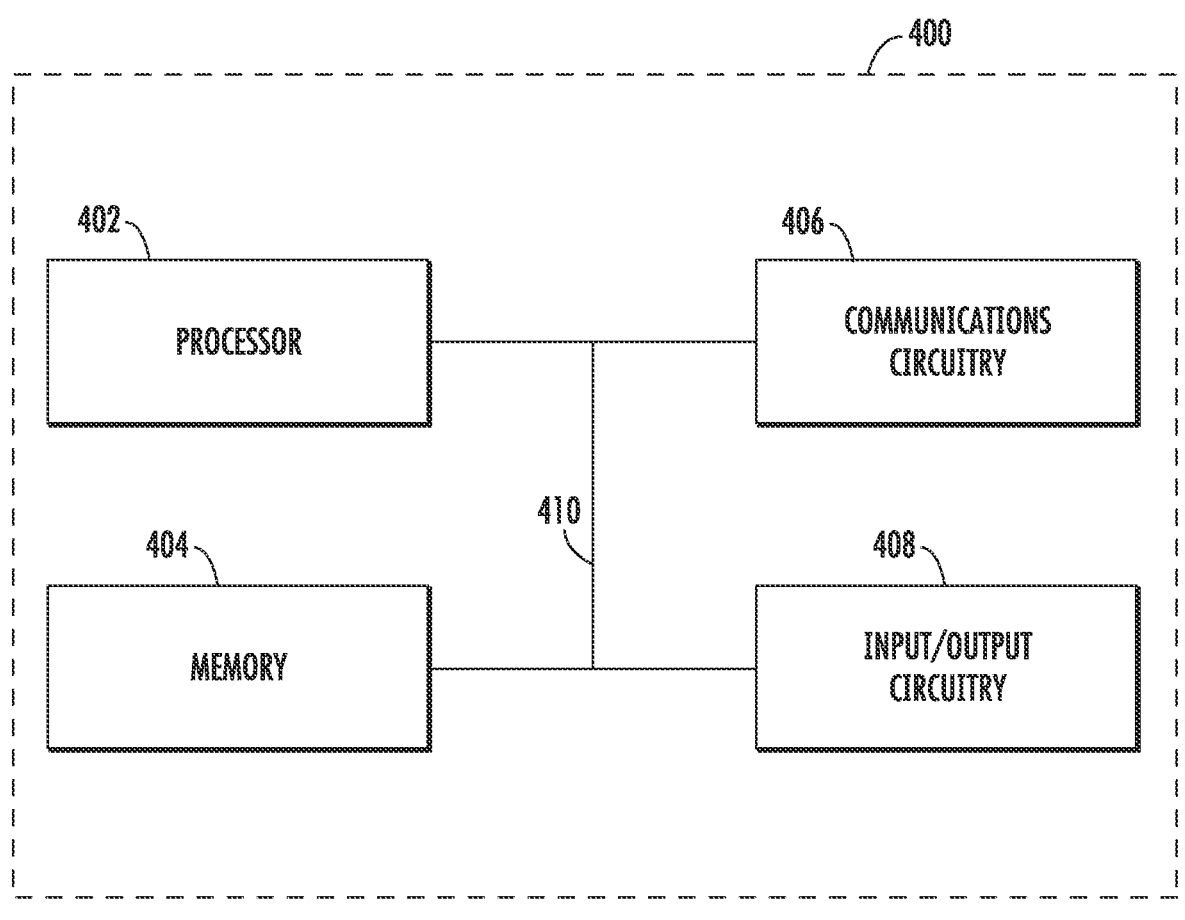

Having thus described certain example embodiments of the present disclosure in general terms, reference will now be made to the accompanying drawings, which are not necessarily drawn to scale, and wherein:

FIG. 1 illustrates an example method for utilizing heatmaps in accordance with one or more embodiments of the present disclosure;

FIG. 2 illustrates a neural network topology for heatmap regression in accordance with one or more embodiments of the present disclosure;

FIGS. 3A & 3B illustrate example flowcharts of operations for heatmap regression in neural networks in accordance with one or more embodiments of the present disclosure; and FIG. 4 illustrates an exemplary device for heatmap regression in neural networks in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

Various embodiments of the present disclosure are directed to improved heatmap regression for neural networks. Various embodiments are related to heatmap regressions for neural networks, particularly for embedded systems. Heatmap regression may be used to determine a plurality of points in one or more images. In various embodiments the one or more points may be related to a person. Heatmap regression may, for example, be employed in computer vision to identify one or more persons in images and/or video.

Embedded systems may be subject to restrictions in processing capacity to efficiently perform heatmap regression with neural networks. The present disclosure is related to an improved method of heatmap regression for neural networks that may be performed with the restricted capacity of embedded systems.

In accordance with the present disclosure, heatmap regression may be performed by a neural network omitting a resolution recovery stage of upsampling or upscaling. Various embodiments of the present disclosure include a neural network with depth channels having both depthwise and pointwise convolution bottlenecks as feature extractors.

In various embodiments, a neural network may use a linear topology and deep quantization. Such neural networks may be more easily used in embedded systems. Various embodiments may include quantization of weights and activations, including to reduce memory requirements. In some embodiments, quantization may be to 8 bits or below 8 bits, which is a typically quantization for embedded systems. Further, embodiments of the present disclosure are performed with more accuracy than conventional systems with the same number of trainable parameters, particularly for quantization at 8 bit or lower.

In various embodiments, the neural network may be performed by an embedded system. An embedded system may be hardware and software designed to perform one or more specific functions, including operating a neural network for heatmap regression. Various embodiments, including embedded systems, may have limited or restricted computations resources (e.g., memory, processor speed, etc.). An exemplary embedded system is a microcontroller. Additionally, embedded systems may use quantization to reduce memory requirements.

In various embodiments, the neural network for heatmap regression may be configured with a plurality of layers. These layers may include a pooling layer for downsampling or downscaling an image. The neural network of the present disclosure has a limit on downscaling or downsampling, and the limit allows for the neural network to omit an otherwise required upsampling or upscaling layer. By removing the upsampling or upscaling, the present disclosure further improves the efficiency of the neural network so that it may be performed with restricted resources, including on embedded systems.

Various embodiments may address the needs of neural network topologies for tiny machine learning (TinyML) applications, particularly with incorporating deep 8 bit/4 bit quantization configurations. TinyML applications include limited computational resources and thus need neural networks that may better utilize limited hardware capabilities, such as neural networks in accordance with the present disclosure.

Exemplary Systems, Apparatuses, and Methods

Embodiments of the present disclosure herein include systems and apparatuses for heatmap regressions for neural networks described herein may be implemented in various embodiments.

FIG. 1 illustrates an example method for utilizing heatmaps in accordance with one or more embodiments of the present disclosure. An image 110 is input into a neural network 120 to generate a heatmap 130. The heatmap 130 may be processed to determine a plurality of coordinates 140 in the heatmap 130. The coordinates 140 may be in a data object. A plurality of visual indicators may be generated and overlaid on the image 110 to provide visual indicators in the image 150, which may be displayed to a user on a user device.

In an exemplary embodiment of a neural network 120, FIG. 1 shows a heatmap 130 regression for predicting human body joint positions in an image 110. The coordinates 140 are overlaid on the image 150 to indicate the joints of a person in the image 150.

The heatmap 130 may be a greyscale image that identifies one or more key points that represent points of interest. The greyscale image may represent these points by lighter (or darker) coloring associated with heat in contrast to a black (or white or contrasting) background. The heat corresponds to the intensity of, for example, a pixel or portion of the image with a coloring proportional to the probability that the pixel or portion of the image contains a target. The greater the heat coloring then the greater the probability.

In the heatmap 130 the heat color of white is associated with the probability of a joint of an individual or an individual's skeleton. The hotter the key point the greater the likelihood of a joint. The joints are the vertex of the skeleton and indicate are used to identify where a person is located in an image. The neural network may generate the greyscale image of the heatmap 130 or data, such as in a data object, may be used rendered for visualization on a display as a heatmap 130.

While FIG. 1 includes an image 110 input into a neural network 120, it will be appreciated that the plurality of images 110 may be sequentially received and/or input into a neural network 120 to perform heatmap regression on video. In particular, a video may be separated into individual images to be input sequentially.

Various embodiments are associated with computer vision. For example, computer vision may utilize heatmap regression of images and/or video to develop an optimized data map of coordinates that may be used to identify one or more subjects or objects in the images or video (e.g., a person). The coordinates 140 may associated with key points landmarking, object localization, semantic segmentation, pose estimation, etc. The neural network 120 may be trained by a user, such as by providing a plurality of images and/or video(s) to generate one or more heatmaps 130, such as a heatmap(s) for each image and/or video. A user may provide input to a device and/or system with the neural network (e.g., an embedded system), to train the neural network. Alternatively, the neural network may be trained off device and loaded onto a device and/or system with the neural network.

FIG. 2 illustrates a neural network topology for heatmap regression in accordance with one or more embodiments of the present disclosure. In accordance with the present disclosure, various embodiments include neural networks 120 with simpler topologies than conventional neural networks for achieving improved performance, particularly on resource constrained devices and/or systems.

Neural network 200 of FIG. 2 is an exemplary embodiment of neural network 120. The neural network 200 extracts a feature vector from an image 110 to generate a heatmap 130. The neural network 200 is comprised of a backbone comprised of a plurality of layers, including pooling layers 212 and convolution layers 214. The neural network 200 may receive an input image 110 and generate a heatmap 130 that may be output. The output may be by storing the heatmap 130 in memory, displaying the heatmap 130 on a display by rendering the heatmap 130, transmitting the heatmap 130 to another device, or the like.

The neural network 200 may be comprised of a plurality of layers. A first layer or input layer 210 may receive the image 110 input to the neural network 200. The input layer may be at a resolution that is of the same size as the image 110. The neural network topology may include this input layer 210 that proceeds to one or more pooling layers 212 that are used to reduce the spatial portions of the image 110 before proceeding to a plurality of layers 214 that will perform convolutions on the depth channels of the layers while keeping the same spatial dimensions as an output layer 218. The output layer 218 is where the features for the heatmap 130 are output.

In the topology of the neural network 200 the pooling layers 212 are limiting in the amount of spatial reduction by the size of the output layer 218. By limiting the resolution reduction of the spatial dimensions to those corresponding spatial dimensions of the output layer 218 the neural network is configured to omit one or more upscaling layers or up sampling layers found in conventional neural networks. By omitting such upscaling or up sampling layers the neural network 200 of the present disclosure may be operated efficiently on devices and systems with restricted requirements.

An image 110 for use in generating a heatmap 130 may be a red-green-blue (RGB) image of a first spatial resolution. The spatial resolution may refer to a height and width of the image, such as the number of pixels. The depth of the image may refer to, in the input image 110, the colors or, in the heatmap, the number of features. An input image may have, for example, a 256×256×3 resolution, with 256×256 being the height and width and the 3 being the three colors. In contrast, the heatmap may be a 64×64×17 image with a height and width of 64×64 and the 17 being the number of features identified in the heatmap. One heat bloom may be one feature. In an embodiment of identifying human joint, the neural network 200 may identify 17 joints with the heatmap 130 associated with the joints of an individual in the image 110.

The pooling layers 212 may reduce the resolution of the input image from 256×256×3 to different dimensions via pooling convolutions used in the pooling layers. For example, two pooling layers 212 may be used. A first pooling layer 212 may reduce the input image dimensions 256×256×3 to 128×128×64. Thus the spatial resolution is reduced to 128×128 and the depth resolution is changed to 64. A second pooling layer may reduce the resolution from 128×128×64 to 64×64×17. Thus the spatial resolution is now 64×64 and the depth is 17. The pooling layers of the present disclosure do not reduce the spatial resolution below the spatial resolution of the output layer 218, which allows for omitting subsequent upscaling. Omitting upscaling or upsampling for resolution recovery also avoids quantization errors that occur with upscaling or sampling, which increases the resiliency when using quantization by improving accuracy.

After the convolutions performed by the pooling layers 212, a plurality of convolution layers 214 perform convolutions on the depth dimensions. The plurality of layers may vary the number of dimensions of the depth layer between layers. By increasing and decreasing the depth dimension of subsequent layers bottlenecks (e.g., 226A, 226B) are created. These bottlenecks are created on the depth channels by stacking depthwise convolutions and pointwise convolutions. This is illustrated at 220 that illustrates the depth channels (from left-to-right) increasing in the number of depth channels, then decreasing in the number of depth channels at bottleneck 226A, then increasing, then decreasing in the number of depth channels at bottleneck 226B, then increasing, then decreasing to the number of depth channels at 228, which is the depth channels or depth resolution of the output layer 218 of the heatmap 130.

In the neural network 200, the number of depth channels is associated with the number of features of in a layer. For example, an output layer 218 may be a 64×64×17 heatmap that has 17 features. By allowing the plurality of convolution layers 214 to have bottleneck layers 216A, 216B that have reduced depth channels at bottlenecks 226A, 226B the neural network is trained to focus on the desired features for the heatmap during training by a user. In various embodiments, the bottlenecks may reduce the number of depth channels to the same number of depth channels or features in the heatmap 130 generated by the neural network 200. In FIG. 2, the plurality of convolution layers 214 are illustrated as layer 220 with 31 convolution layers of varying sizes of depth channels. The first bottleneck 226A is at the 11th convolution layer. The second bottleneck is at the 21st convolution layer. As illustrated, these depthwise and pointwise bottlenecks are sequentially stacked. The output layer 218 is at the 31st convolution layer 228. Each convolution layer may have a different number of filters, with each filter associated with a feature or depth, and by reducing and expanding the number of filters the feature extraction is improved and the number of trainable parameters of the neural network is kept low. This, among other things, improves the operation of the neural network 200 on embedded systems.

In various embodiments, the neural network may be trained to have a desired number of bottlenecks. The depthwise bottlenecks and pointwise bottlenecks reduce and expand the number of filters or features in a convolution layer. The number of bottlenecks is associated with the accuracy, such as a number of features that are desired to be identified in a heatmap 130.

With the neural network 200 the spatial information of the output layer 218 is not comprised and a higher resolution is kept compared to neural networks requiring resolution recovery or upscaling. Thus the spatial dimensions are not a restraint but rather depth dimensions of the plurality of convolution layers 214 is a constraint varied.

A convolution may be a three dimensional operation that performs one or more calculations on one or more portions of an image or dataset to determine, for example, a three-dimensional output. A convolution layer may include multiple filters for use during a convolution operation, and each filter may be referred to a separate convolution calculation to determine if a specific feature is present. A filter may include a plurality of weights.

By providing bottlenecks to the depth dimension certain convolution operations of the present disclosure may have their depth increased (expanded) or decreased (shrunk). The depth may be determined by the number of filters a convolution operation uses. The variation may be an increase or decrease in the number of filters and or filter size.

For example, one of the plurality of convolution layers 214 may go to 100 filters then at a bottleneck another of the plurality of convolution layers may be reduced to 17 filters. Such expansion and shrinking may occur with multiple bottlenecks. The bottlenecks are layers in which the neural network 200 is forced to extract important features for the output layer 218 for generating the heatmap 130.

In various embodiments, the number of bottlenecks (e.g., 226A, 226B, etc.) may be a hyperparameter that may be tuned by a user during training of the neural network, such as with a user input. Once a neural network has been trained, the neural network may be operated to generate a heatmap.

Additionally, various embodiments of the present disclosure may also utilize quantization schemes to or below 8 bits. Quantization may map floating point numbers to smaller bit width approximation. As such, a larger data object may be mapped to a smaller resolution data object representing the larger data object. In various embodiments, quantization may occur on neural network weights, biases, and activations. This reduces the memory footprint required for storing and executing the neural network. Additionally, execution may be leveraged on fast fixed-point arithmetic.

FIGS. 3A & 3B illustrate example flowcharts of operations for heatmap regression in neural networks in accordance with one or more embodiments of the present disclosure.

FIG. 3A illustrates operations for generating a heatmap with an apparatus of system.

At operation 302, a device may receive an image. In various embodiments, the device may receive an input from another device. Alternatively or additionally, a device may capture an image or video, such as via a camera. If a video is received or captured, the video may be separated into a plurality of images.

At operation 304, the neural network generates a heatmap via heatmap regressions. A heatmap 130 is generated, such as in accordance with the disclosure associated with FIG. 3B. The heatmap 130 may be in a format to be displayed on a display or may be in a data object that may be rendered.

At operation 306, the heatmap is transmitted. The heatmap 130 may be transmitted to a display on the device or may be transmitted to another device for display. To display the heatmap 130 may include rendering a data object of the heatmap 130 to visualize the heatmap 130.

In various embodiments, additional operations may include performing one or more transformations of the heatmap 130 to transform the heatmap into a plurality of coordinates that are associated with the plurality of features of the heatmap 130. The coordinate may be stored in a data object. The coordinates may be key points for features identified by the heatmap. The coordinates may also be used for one or more additional operations. In some embodiments, the coordinates may be used to generate a second image 150 with indicators associated with the coordinate locations are overlaid on an input image 110. The visual indicators may allow provide indication on the image 150 to display where the heatmap 130 identified features on the input image 110. The image 150 may be displayed or rendered on a display of a user device. In various embodiments, the coordinates may be an input to one or more subsequent operations and/or algorithms. For example, these may predict or be used to determine a pose of one or more subjects associated with the coordinates (e.g., person, animal, object, etc.). In another example, these may predict or be used to determine an activity or type of activity be performed by one or more subjects associated with the coordinates. In another example, these may predict or be used to determine a movement or type of movement one or more subjects is doing.

FIG. 3B illustrates operations for a neural network for heatmap regression.

At operation 312, one or more pooling layers may be used to reduce spatial resolution. An input image 110 may be provided to the neural network 200. The neural network may use a pooling layer 212 to reduce the spatial resolution, which may include increasing the layers in the depth channel.

At operation 314, if the spatial resolution of the current layer is the same as the output layer, then may proceed to operation 316 otherwise may proceed to iterate operation 312.

At operation 316, extract features via a depth channels of convolution layers by stacking depthwise and pointwise convolution bottlenecks. The neural network 200 may proceed to a plurality of convolution layers that utilizing convolution operations that keep the spatial resolution of each layer the same while changing the number of features in the depth channel. The number of features may be changed by stacking depthwise convolutions and pointwise convolutions over multiple convolution layers to create bottlenecks.

In various embodiments, the neural network 200 will be trained before being operated. The training of the neural network by a user will determine how many bottlenecks the neural network 200 will have.

At operation 318, generate heatmap from output layer. The output layer 218 of the neural network 200 will have been trained to a number of depth channels associated with features to identify an associated number of key points for an object in an image. For example, for computer vision associated with identifying a person, the identification of a person may be associated with identifying 17 key points and the output of the neural network may be trained to identify 17 features. The 17 features may be the 17 coordinates in a heatmap. In various embodiments the generation of a heatmap may include generating an image that depicts the heatmap.

FIG. 4 illustrates an exemplary device for heatmap regression in neural networks in accordance with one or more embodiments of the present disclosure.

A device 400 illustrated may be a system and/or apparatus that includes a processor 402, memory 404, communications circuitry 406, input/output circuitry 408, and all of which may be connected. While such connections are illustrated as bus 410, it will be readily appreciated that there may be multiple other connections. The device 400 may perform one or more operations as described in the present disclosure. In various embodiments, the device 400 may be an embedded system.

The processor 402, although illustrated as a single block, may be comprised of a plurality of components and/or processor circuitry. The processor 402 may be implemented as, for example, various components and/or circuitry comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits. In various embodiments, the processor 402 may be configured to execute applications, instructions, and/or programs stored in the processor 402, memory 404, or otherwise accessible to the processor 402. When executed by the processor 402, these applications, instructions, and/or programs may enable the execution of one or a plurality of the operations and/or functions described herein. Regardless of whether it is configured by hardware, firmware/software methods, or a combination thereof, the processor 402 may comprise entities capable of executing operations and/or functions according to the embodiments of the present disclosure when correspondingly configured.

The memory 404 may comprise, for example, a volatile memory, a non-volatile memory, or a certain combination thereof. Although illustrated as a single block, the memory 404 may comprise a plurality of memory components. In various embodiments, the memory 404 may comprise, for example, a random access memory, a cache memory, a flash memory, a hard disk, a circuit configured to store information, or a combination thereof. The memory 404 may be configured to write or store data, information, application programs, instructions, etc. so that the processor 402 may execute various operations and/or functions according to the embodiments of the present disclosure. For example, in at least some embodiments, a memory 404 may be configured to buffer or cache data for processing by the processor 402. Additionally or alternatively, in at least some embodiments, the memory 404 may be configured to store program instructions for execution by the processor 402. The memory 404 may store information in the form of static and/or dynamic information. When the operations and/or functions are executed, the stored information may be stored and/or used by the processor 402.

The communication circuitry 406 may be implemented as a circuit, circuitry, hardware, computer program product, or a combination thereof, which is configured to receive and/or transmit data from/to another component or apparatus. The computer program product may comprise computer-readable program instructions stored on a computer-readable medium (e.g., memory 404) and executed by a processor 802. In various embodiments, the communication circuitry 406 (as with other components discussed herein) may be at least partially implemented as part of the processor 402 or otherwise controlled by the processor 402. The communication circuitry 406 may communicate with the processor 402, for example, through a bus 410. Such a bus 410 may connect to the processor 402, and it may also connect to one or more other components of the processor 402. The communication circuitry 406 may be comprised of, for example, transmitters, receivers, transceivers, network interface cards and/or supporting hardware and/or firmware/software, and may be used for establishing communication with another component(s), apparatus(es), and/or system(s). The communication circuitry 406 may be configured to receive and/or transmit data that may be stored by, for example, the memory 404 by using one or more protocols that can be used for communication between components, apparatuses, and/or systems.

The input/output circuitry 408 may communicate with the processor 402 to receive instructions input by an operator and/or to provide audible, visual, mechanical, or other outputs to an operator. The input/output circuitry 408 may comprise supporting devices, such as a keyboard, a mouse, a user interface, a display, a touch screen display, lights (e.g., warning lights), indicators, speakers, cameras, and/or other input/output mechanisms. The input/output circuitry 408 may comprise one or more interfaces to which supporting devices may be connected. In various embodiments, aspects of the input/output circuitry 408 may be implemented on a device used by the operator to communicate with the processor 402. The input/output circuitry 408 may communicate with the memory 404, the communication circuitry 406, and/or any other component, for example, through a bus 410.

It should be readily appreciated that the embodiments of the systems and apparatuses, described herein may be configured in various additional and alternative manners in addition to those expressly described herein to perform at least one or more operations described herein.

CONCLUSION

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A method for heatmap regression with a neural network comprising:

receiving an image;

generating a heatmap from the image with the neural network by:

reducing a spatial resolution of the image with one or more pooling layers, wherein a reduction in the spatial resolution is to a spatial resolution of an output layer;

performing a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers;

generating the output layer with a depth channel of a first depth resolution; and generating a heatmap with a plurality of key points, wherein a number of the plurality of key points equals the first depth resolution.

2. The method for heatmap regression with a neural network of claim 1, wherein a depth channel resolution of at least one of the plurality of depthwise convolution and pointwise convolution bottlenecks has the same depth channel resolution as the output layer.

3. The method for heatmap regression with a neural network of claim 1, wherein a depth channel resolution of each of the plurality of depthwise convolution and pointwise convolution bottlenecks is the same.

4. The method for heatmap regression with a neural network of claim 1, wherein a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

5. The method for heatmap regression with a neural network of claim 1, wherein the one or more pooling layers include two pooling layers.

6. The method for heatmap regression with a neural network of claim 1, wherein the spatial resolution of the output layer is 64×64 pixels and a depth channel resolution of the output layer is 17 features.

7. The method for heatmap regression with a neural network of claim 1, wherein the plurality of key points of the heatmap are coordinates in the image identifying a person.

8. A system for heatmap regression with a neural network comprising:

at least one processor and at least one memory coupled to the at least one processor, wherein the at least one processor is configured to:

receive an image;

generate a heatmap from the image with the neural network by:

reduce a spatial resolution of the image with one or more pooling layers, wherein a reduction in the spatial resolution is to a spatial resolution of an output layer;

perform a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers;

generate the output layer with a depth channel of a first depth resolution; and generate a heatmap with a plurality of key points, wherein a number of the plurality of key points equals the first depth resolution.

9. The system for heatmap regression with a neural network of claim 8, wherein a depth channel resolution of at least one of the plurality of depthwise convolution and pointwise convolution bottlenecks has the same depth channel resolution as the output layer.

10. The system for heatmap regression with a neural network of claim 8, wherein a depth channel resolution of each of the plurality of depthwise convolution and pointwise convolution bottlenecks is the same.

11. The system for heatmap regression with a neural network of claim 8, wherein a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

12. The system for heatmap regression with a neural network of claim 8, wherein the one or more pooling layers include two pooling layers.

13. The system for heatmap regression with a neural network of claim 8, wherein the spatial resolution of the output layer is 64×64 pixels and a depth channel resolution of the output layer is 17 features.

14. The system for heatmap regression with a neural network of claim 8, wherein the pluality of key points of the heatmap are coordinates in the image identifying a person.

15. A computer program product for heatmap regression with a neural network comprising at least one non-transitory computer-readable storage medium having computer-readable program code portions stored therein, the computer-readable program code portions comprising an executable portion configured to:

receive an image;

generate a heatmap from the image with the neural network by:

reduce a spatial resolution of the image with one or more pooling layers, wherein a reduction in the spatial resolution is to a spatial resolution of an output layer;

perform a plurality of convolution operations with a plurality of convolution layers, wherein the plurality of convolution layers each have the same spatial resolution, and wherein the neural network includes a plurality of depthwise convolution and pointwise convolution bottlenecks varying a plurality depth channels associated with the plurality of convolution layers;

generate the output layer with a depth channel of a first depth resolution; and generate a heatmap with a plurality of key points, wherein a number of the plurality of key points equals the first depth resolution.

16. The computer program product for heatmap regression with a neural network of claim 15, wherein a depth channel resolution of at least one of the plurality of depthwise convolution and pointwise convolution bottlenecks has the same depth channel resolution as the output layer.

17. The computer program product for heatmap regression with a neural network of claim 15, wherein a depth channel resolution of each of the plurality of depthwise convolution and pointwise convolution bottlenecks is the same.

18. The computer program product for heatmap regression with a neural network of claim 15, wherein a first depth channel resolution of a first bottleneck of the plurality of depthwise convolution and pointwise convolution bottlenecks is different than a second depth channel resolution of a second bottleneck of the plurality of depthwise convolution and pointwise convolution bottlenecks.

19. The computer program product for heatmap regression with a neural network of claim 15, wherein the one or more pooling layers include two pooling layers.

20. The computer program product for heatmap regression with a neural network of claim 15, wherein the plurality of key points of the heatmap are coordinates in the image identifying a person.

\* \* \* \* \*